US011715209B2

(12) United States Patent
Li et al.

(10) Patent No.: US 11,715,209 B2
(45) Date of Patent: *Aug. 1, 2023

(54) LOCATING METHOD AND SYSTEM

(71) Applicant: ZHEJIANG DAHUA TECHNOLOGY CO., LTD., Zhejiang (CN)

(72) Inventors: Qiankun Li, Hangzhou (CN); Wei Lu, Hangzhou (CN); Shizhu Pan, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 158 days.

This patent is subject to a terminal disclaimer.

(21) Appl. No.: 17/361,300

(22) Filed: Jun. 28, 2021

(65) Prior Publication Data

US 2021/0326632 A1  Oct. 21, 2021

Related U.S. Application Data

(63) Continuation of application No. 16/513,804, filed on Jul. 17, 2019, now Pat. No. 11,048,961, which is a
(Continued)

(30) Foreign Application Priority Data

Jan. 19, 2017  (CN) .......................... 201710047787.0

(51) Int. Cl.
*G06T 7/11*  (2017.01)
*G06T 7/50*  (2017.01)
*G06V 20/10*  (2022.01)

(52) U.S. Cl.
CPC .................. *G06T 7/11* (2017.01); *G06T 7/50* (2017.01); *G06V 20/10* (2022.01); *G06T 2207/10028* (2013.01)

(58) Field of Classification Search
CPC .......... G06K 9/46; G06K 9/6212; G06T 7/50; G06T 2207/10028
See application file for complete search history.

(56) References Cited

U.S. PATENT DOCUMENTS

| 9,996,945 B1* | 6/2018 | Holzer ..................... G06K 9/22 |
| 2004/0125207 A1* | 7/2004 | Mittal ..................... G06T 7/277 |
| | | 348/169 |

(Continued)

FOREIGN PATENT DOCUMENTS

| CN | 101694716 A | 4/2010 |
| CN | 103337077 A | 10/2013 |

(Continued)

OTHER PUBLICATIONS

International Search Report in PCT/CN2017/119391 dated Apr. 3, 2018, 4 pages.
(Continued)

*Primary Examiner* — Fayyaz Alam
(74) *Attorney, Agent, or Firm* — Metis IP LLC

(57) ABSTRACT

A method and system for locating a target object in a target scene. The method may include obtaining a depth image of the target scene. The depth image may include a plurality of pixels. The method may also include, for each of the plurality of pixels of the depth image, determining a first target coordinate under a target coordinate system. The method may further include generating a marking image according to the depth image and the first target coordinates of the plurality of pixels in the depth image. The marking image may represent potential target objects in the depth image. The method may also include determining a locating coordinate of the target object under the target coordinate system according to the marking image.

20 Claims, 8 Drawing Sheets

Related U.S. Application Data continuation of application No. PCT/CN2017/119391, filed on Dec. 28, 2017.

(56) References Cited

U.S. PATENT DOCUMENTS

| | | | | |
|---|---|---|---|---|
| 2005/0117033 | A1* | 6/2005 | Matsui | G01S 3/7864 348/239 |
| 2014/0049647 | A1* | 2/2014 | Lek | G06K 9/6267 348/148 |
| 2016/0125243 | A1* | 5/2016 | Arata | G06K 9/00362 382/103 |
| 2018/0343442 | A1* | 11/2018 | Yoshikawa | H04N 21/2143 |

FOREIGN PATENT DOCUMENTS

| | | |
|---|---|---|
| CN | 104346614 A | 2/2015 |
| CN | 104835147 A | 8/2015 |
| CN | 104935893 A | 9/2015 |
| CN | 105157608 A | 12/2015 |
| CN | 106204605 A | 12/2016 |
| CN | 106875444 A | 6/2017 |
| JP | 2012059009 A | 3/2012 |

OTHER PUBLICATIONS

Written Opinion in PCT/CN2017/119391 dated Apr. 3, 2018, 5 pages.
Wang, Ping et al., The Extraction of Depth Information about the Object Based on Binocular Vision, Science Technology and Engineering, 14(2): 56-61, 2014.
Luan, Tingting, Object Detection and Positioning of Mobile Robot Based on Binocular Vision, China Excellent Master's Thesis Full-text Database Information Technology Series, 2016, 61 pages.
Shireen Y. Elhabian et al., Moving Object Detection in Spatial Domain Using Background Removal Techniques-State-of-Art, Recent Patents on Computer Science, 1(1): 32-54, 2008.
Dingrui Wan et al., Stereo Vision Using Two PTZ Cameras, Computer Vision and Image Understanding, 112(2): 184-194, 2008.
The Extended European Search Report in European Application No. 17892174.8 dated Nov. 6, 2019, 8 pages.

* cited by examiner

400

Obtaining a depth image of a target scene, the depth image including a plurality of pixels — 410

For each of the plurality of pixels of the depth image, determining a first target coordinate under a target coordinate system — 420

Generating a marking image according to the depth image and the first target coordinates of the plurality of pixels in the depth image, wherein the marking image represents potential target objects in the depth image — 430

Determining a locating coordinate of the target object under the target coordinate system according to the marking image — 440

```
┌─────────────────────────────────────────────────────────┐
│ Obtaining two original images of a target scene         │
│ respectively taken by a left camera and a right camera  │─ 510
│ of a binocular camera, and determining a depth image    │
│ according to the two original images                    │
└─────────────────────────────────────────────────────────┘
                            │
┌─────────────────────────────────────────────────────────┐
│ determining a three-dimensional coordinate of an actual │
│ position corresponding to each pixel of the depth image │─ 520
│ under a target coordinate system                        │
└─────────────────────────────────────────────────────────┘
                            │
┌─────────────────────────────────────────────────────────┐
│ Sifting out first target pixels from the depth image    │
│ and generating a marking image according to a position  │─ 530
│ distribution of the plurality of first target pixels in │
│ the depth image                                         │
└─────────────────────────────────────────────────────────┘
                            │
┌─────────────────────────────────────────────────────────┐
│ Determining at least one connected region in the        │─ 540
│ marking image                                           │
└─────────────────────────────────────────────────────────┘
                            │
┌─────────────────────────────────────────────────────────┐
│ Sifting out at a target connected region with a number  │
│ of pixels greater than or equal to a preset threshold   │
│ from the at least one connected region, and assigning a │
│ three-dimensional coordinate of an actual position      │─ 550
│ corresponding to a center of the target connected       │
│ region under the target coordinate system as the        │
│ three-dimensional coordinate of the target object in    │
│ the target scene                                        │
└─────────────────────────────────────────────────────────┘
```

FIG. 5

LOCATING METHOD AND SYSTEM

CROSS REFERENCE

This application is a continuation of U.S. application Ser. No. 16/513,804 filed on Jul. 17, 2019, which is a continuation of International Application No. PCT/CN2017/119391, filed on Dec. 28, 2017, which claims priority of Chinese Application No. 201710047787.0 filed on Jan. 19, 2017. Each of the above-referenced applications is incorporated herein by reference in their entireties.

TECHNICAL FIELD

The present disclosure generally relates to a technical field of locating of a target object, and more particularly to a system and method for locating the target object according to images.

BACKGROUND

During the shooting of some scenes, sometimes it is needed to shoot a key object in a scene in close-up, which requires an accurate locating of the key object. For example, in a scene such as a classroom or a meeting room, when a person stands up, it is usually needed to shoot the stand-up person in close-up, which requires an accurate locating of the stand-up person. As another example, when a person appears in a restricted area, shooting the person in close-up may also facilitate the identification of the violated person, which may also require that the violated person is accurately located.

In prior arts, a target is usually located through a feature point identification technique with a following flow: pre-acquiring feature parameters of feature points belonging to a particular target and storing the same, and matching feature parameters of feature points belonging to an object currently present in the scene with the stored feature parameters. If the matching is successful, the object successfully matched is determined to be the target.

Apparently, in the aforementioned technique, a target object may be accurately located only when pre-stored feature parameters include feature parameters of the target object to be located, which may cause an inflexible locating of the target object with a low locating accuracy.

SUMMARY

According to an aspect of the present disclosure, a locating system for locating a target object in a target scene may include at least one locating device. During operation, the at least one locating device may be configured to obtain a depth image of the target scene, the depth image including a plurality of pixels. The at least one locating device may also be configured to, for each of the plurality of pixels of the depth image, determine a first target coordinate under a target coordinate system. The at least one locating device may further be configured to generate a marking image according to the depth image and the first target coordinates of the plurality of pixels in the depth image, and determine a locating coordinate of the target object under the target coordinate system according to the marking image. The marking image may represent potential target objects in the depth image.

In some embodiments, to generate the depth image, the at least one locating device may be configured to receive first electronic signals including a first image of the target scene taken by a first image sensor, and receive second electronic signals including a second image of the target scene taken by a second image sensor. The at least one locating device may also be configured to, for each pixel in the first image, determine a horizontal parallax between the pixel of the first image and a corresponding pixel of the second image, and, according to the horizontal parallax, assign a gray value to a corresponding pixel of the depth image.

In some embodiments, the locating system may also include the first image sensor and the second image sensor. The second image sensor may be at a predetermined distance from the first image sensor. The first image sensor may be configured to obtain the first image of the target scene. The second image sensor may be configured to obtain the second image of the target scene simultaneously with the first image sensor. The first image may include a plurality of pixels one-to-one corresponding to a plurality of pixels in the second image.

In some embodiments, the first image sensor may be at least part of a first camera in a binocular camera, and the second image sensor may be at least part of a second camera in the binocular camera.

In some embodiments, for each of the plurality of pixels in the depth image, to determine the first target coordinate, the at least one locating device may be configured to determine a sensor coordinate of the pixel under a sensor coordinate system with respect to the first image sensor according to a first image coordinate and the gray value of the pixel, and determine the first target coordinate according to the sensor coordinate of the pixel.

In some embodiments, the locating system may further comprise a controller. The locating device may be further configured to transmit third electronic signals including the locating coordinate to the controller. The controller, upon receiving the third electronic signals, may transmit a control signal to at least one of the first image sensor or the second image sensor, causing the at least one of the first image sensor or the second image sensor to be focused or zoomed in towards the locating coordinate.

In some embodiments, to generate the marking image according to the depth image and the plurality of first target coordinates, the at least one locating device may be configured to determine disrupting pixels in the depth image, and determine a second target coordinate for each of the disrupting pixels. The at least one locating device may also be configured to: determine an interference range in the target scene according to the second target coordinates and a target region in the target scene where the target object is predicted to appear, and determine an identification range in the target scene according to the interference range and the target region. The identification range may not overlap with the interference range. The at least one locating device may further be configured to identify first target pixels having third target coordinates within the identification range in the depth image, and generate the marking image according to the first target pixels.

In some embodiments, the marking image may include second target pixels corresponding to the first target pixels. The second target pixels may have first gray values, and other pixels in the marking image may have second gray values.

In some embodiments, to determine the locating coordinate of the target object according to the marking image, the at least one locating device may be configured to: determine a target connected component in the marking image; determine a locating point in the marking image according to the connected component; and determine the locating coordinate according to a second image coordinate of the locating point.

In some embodiments, to determine the target connected component in the marking image, the at least one locating device may be configured to determine at least one connected component in the marking image, and identify a connected component having a number of pixels greater than or equal to a preset threshold from the at least one connected component as the target connected component.

According to another aspect of the present disclosure, a locating system for locating a target object in a target scene may include a locating device. The locating device may include a depth image module, a coordinate determination module, a marking image module, and a locating coordinate determination module. The depth image module may be configured to obtain a depth image of the target scene. The depth image may include a plurality of pixels. For each of the plurality of pixels of the depth image, the coordinate determination module may be configured to determine a first target coordinate under a target coordinate system. The marking image module may be configured to generate a marking image according to the depth image and the first target coordinates of the plurality of pixels in the depth image. The marking image may represent potential target objects in the depth image. The locating coordinate determination module may be configured to determine a locating coordinate of the target object under the target coordinate system according to the marking image.

In some embodiments, the depth image module may be configured to receive first electronic signals including a first image of the target scene taken by a first image sensor, and receive second electronic signals including a second image of the target scene taken by a second image sensor. The depth image module may also be configured to, for each pixel in the first image, determine a horizontal parallax between the pixel of the first image and a corresponding pixel of the second image, and, according to the horizontal parallax, assign a gray value to a corresponding pixel of the depth image.

In some embodiments, the locating system may further include the first image sensor and the second image sensor. The second image sensor may be at a predetermined distance from the first image sensor. The first image sensor may be configured to obtain the first image of the target scene, and the second image sensor may be configured to obtain the second image of the target scene simultaneously with the first image sensor. The first image includes a plurality of pixels one-to-one corresponding to a plurality of pixels in the second image.

In some embodiments, the first image sensor may be at least part of a first camera in a binocular camera, and the second image sensor may be at least part of a second camera in the binocular camera.

In some embodiments, for each of the plurality of pixels in the depth image, to determine the first target coordinate, the coordinate determination unit may be configured to determine a sensor coordinate of the pixel under a sensor coordinate system with respect to the first image sensor according to a first image coordinate and the gray value of the pixel, and determine the first target coordinate according to the sensor coordinate of the pixel.

In some embodiments, the locating system may further include a controller. The locating device may be further configured to transmit third electronic signals including the locating coordinate to the controller. The controller, upon receiving the third electronic signals, may transmit a control signal to at least one of the first image sensor or the second image sensor, causing the at least one of the first image sensor or the second image sensor to be focused or zoomed in towards the locating coordinate.

In some embodiments, to generate the marking image according to the depth image and the plurality of first target coordinates, the marking image module may be configured to determine disrupting pixels in the depth image, and determine a second target coordinate for each of the disrupting pixels. The marking image module may also be configured to determine an interference range in the target scene according to the second target coordinates and a target region in the target scene where the target object is predicted to appear, and determine an identification range in the target scene according to the interference range and the target region. The identification range may not overlap with the interference range. The marking image module may further be configured to identify first target pixels having third target coordinates within the identification range in the depth image, and generate the marking image according to the first target pixels.

In some embodiments, the marking image may include second target pixels corresponding to the first target pixels. The second target pixels may have first gray values, and other pixels in the marking image may have second gray values.

In some embodiments, to determine the locating coordinate of the target object according to the marking image, the locating coordinate determination module may be configured to determine a target connected component in the marking image, determine a locating point in the marking image according to the connected component, and determine the locating coordinate according to a second image coordinate of the locating point.

In some embodiments, to determine the target connected component in the marking image, the locating coordinate determination module may be configured to determine at least one connected component in the marking image, and identify a connected component having a number of pixels greater than or equal to a preset threshold from the at least one connected component as the target connected component.

According yet to another aspect of the present disclosure, a method for locating a target object in a target scene may include obtaining, by a locating device, a depth image of the target scene. The depth image may include a plurality of pixels. The method may also include, for each of the plurality of pixels of the depth image, determining, by the locating device, a first target coordinate under a target coordinate system. The method may further include generating, by the locating device, a marking image according to the depth image and the first target coordinates of the plurality of pixels in the depth image. The marking image may represent potential target objects in the depth image. The method may also include determining, by the locating device, a locating coordinate of the target object under the target coordinate system according to the marking image.

According yet to another aspect of the present disclosure, a non-transitory computer readable medium may store instructions. The instructions, when executed by a processor, may cause the processor to execute operations. The operation may include obtaining a depth image of the target scene. The depth image may include a plurality of pixels. The operation may also include, for each of the plurality of pixels of the depth image, determining a first target coordinate under a target coordinate system. The operation may further include generating a marking image according to the depth image and the first target coordinates of the plurality of pixels in the depth image. The marking image may represent potential target objects in the depth image. The operation may also include determining a locating coordinate of the target object under the target coordinate system according to the marking image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 4 is a schematic diagram illustrating an exemplary locating process according to some embodiments of the present disclosure;

FIG. 5 is a schematic diagram illustrating an exemplary locating process according to some embodiments of the present disclosure;

DETAILED DESCRIPTION

The present disclosure is directed to a target locating method and device for flexible locating a target object with high locating accuracy.

In the following detailed description, numerous specific details are set forth by way of examples to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and range of the present disclosure. Thus, the present disclosure is not limited to the embodiments shown, but to be accorded the widest range consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 2:
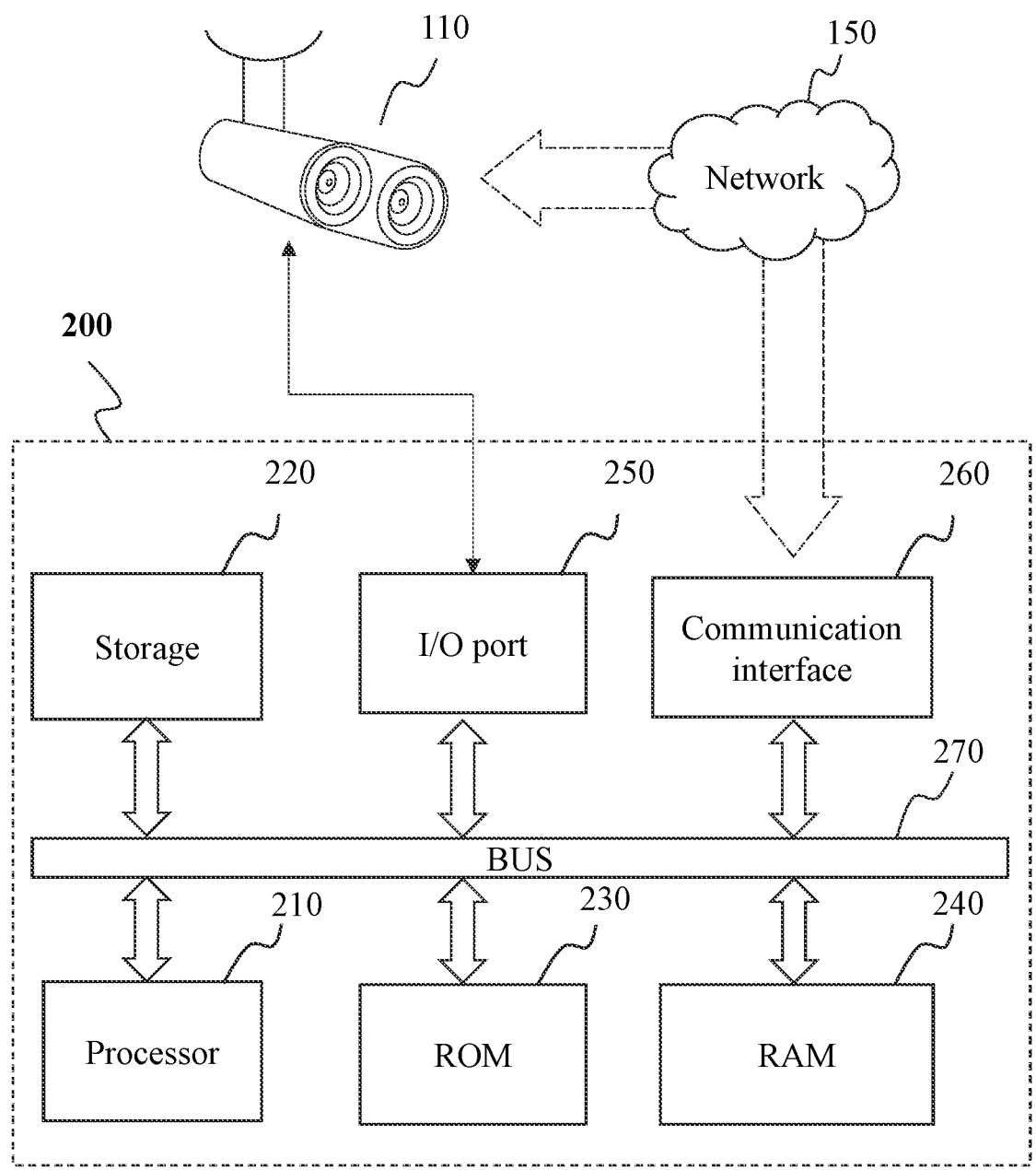
FIG. 2 illustrates an exemplary computing device for implementing one or more components of the locating system.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2-A) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

It may be noted that, the term "image" used in this disclosure generally relates to still pictures, motion pictures, videos (offline or live streaming), frames of a video, or the like, or a combination thereof. The basic unit of an image may also be generally referred to as a pixel.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the range of the present disclosure.

Figure 1:
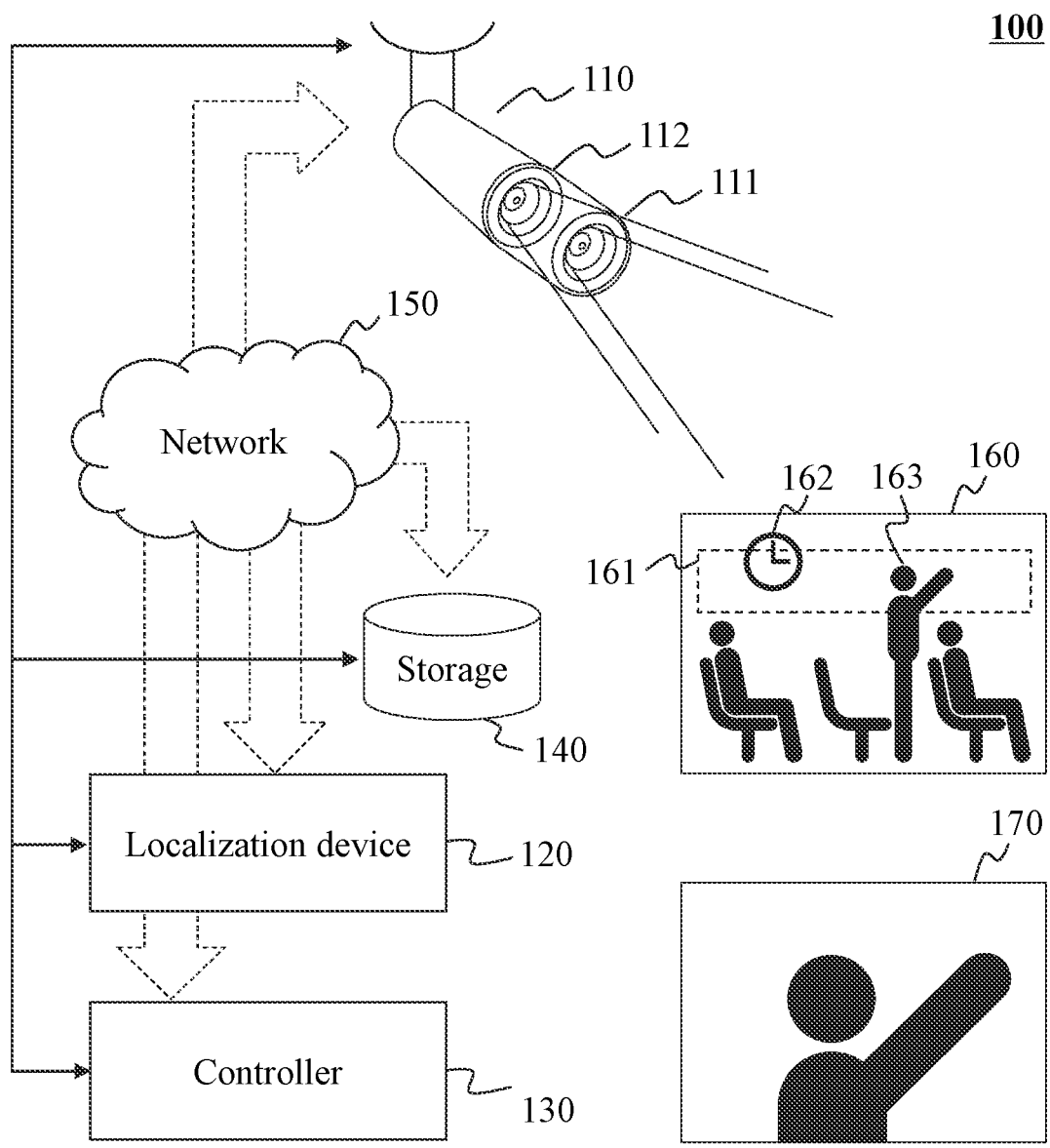
FIG. 1 is a schematic diagram illustrating an exemplary locating system according to some embodiments of the present disclosure.

FIG. 1 is a schematic diagram illustrating an exemplary locating system according to some embodiments of the present disclosure. As shown, locating system 100 may include an image capturing mechanism 110, a locating device 120, a controller 130, a storage 140, and a network 150.

The image capturing mechanism 110 may be configured to capture a plurality of images of a target scene 160. The image capturing mechanism may include a plurality of image sensors for capturing a plurality of images (or be referred to as an original image) of the target scene 160 simultaneously. The image sensors may be cameras, thermal imagers, and/or any other imaging components capable of sensing the target scene 160 and generating images thereof.

In some embodiments, the image sensors may be integrated into a same device (as illustrated in FIG. 1). For example, the image capturing mechanism 110 may be a binocular camera including a left (with respect to the binocular camera) camera 111 and a right camera 112. In some embodiments, when the two cameras of the binocular camera are sufficiently close to each other, the two original images may be substantially similar to each other. Accordingly, pixels in the two original images may correspond with respect to each other. For example, when the two cameras simultaneously take images (i.e., a first image and a second image) to a same scene, each pixel in the first image (or at least a majority part of it) taken by the first camera may one-to-one correspond with a pixel in the second image taken by the second camera.

In some embodiments, the image sensors may be included by a plurality of devices. For example, the image sensors may each be a standalone camera and act in cooperation to obtain original images of the target scene.

The image capturing mechanism 110 may also include other functional devices or modules for obtaining original images under different circumstance. For example, the image capturing mechanism 110 may include one or more infrared lights and/or flashlights in cooperation with the image sensors for capturing images under low-light environments.

The original images captured by the image capturing mechanism 110 may be transmitted to the locating device 120 for locating or be transmitted to the storage 140 for storage.

The locating device 120 may be configured to locating a target object 163 in the target scene 160 according to the original images of the target scene 160 taken by the image capturing mechanism 110. The target object 163 may be an object of interest in the target scene 160. At least part of the target object 163 may be predicted to be appear in a target region 161 in the target scene. The locating device 120 may also be capable of distinguish the target object 163 from one or more interferents 162 presented in the target region. The locating device 120 may be implemented by a computing device 200 as illustrated in FIG. 2 or one or more logic circuits.

In some embodiment, the target object 163 may be determined according to the target region 161. For example, the target region 161 may be predetermined, and an object may be identified as a target object for a reason that at least part of it appears in the target region 161. In some embodiments, the property of the target object 163 and the target region 161 may be both predetermined, and only an object with the predetermined property entering into the target region 161 may be identified as a target object.

In some embodiments, the target region 161 may be determined according to the target object 163. For example, the target object 163 may be predetermined, and a region in the target scene may be set as a target region for a reason that at least part of the target object 163 has a high possibility to appear in that region.

The target scene 160, the target region 161, and the target object 163 may be set according to an application field of the locating system 100. Three exemplary application field of the locating system 100 are described below, which are only for demonstration purposes and not intended to be limiting.

In a first exemplary application field, the target object 163 may be a stand-up person, the target scene 160 may be a conference room. The target region 161 may be set according to the height distribution of the stand-up person so that at least a part of the stand-up person may be included in the target region 161. A sit-down person may not be included in the target region 161 or be treated like an interferent.

In a second exemplary application field, the target scene 160 may be a region under surveillance and the target region 161 may be a restricted area or a key area (e.g., entrance, exit, corridor) within the target scene 160. The target object 163 may be a potential intruder presented in the target region 161.

In a third exemplary application field, the image capturing mechanism 110 may be installed on a vehicle, and the target scene 160 may be a road view. The target region 161 may be a region adjacent to the vehicle and possibly be a blind zone of a driver (human or electronic) of the vehicle. The target object 163 may be an obstacle (e.g., pedestrian, vehicle, building) presented in the target region 161.

The locating device 120 may obtain a depth image according to the original obtain images from the image capturing mechanism 110 or the storage 140 and generate a depth image (may also be referred to as a range image) therefrom. The depth image may represent distances to points in the target scene 160 corresponding to pixels of the depth image from a reference point associated with the image capturing mechanism 110 (e.g., an optical center of one of the cameras included in the image capturing mechanism 110). The locating device 120 may determine a coordinate for each of a first plurality of pixels of the depth image under a target coordinate system (i.e., a world coordinate system) and generate a marking image according to the depth image and the determined coordinates. The marking image may represent objects in the depth image that may potentially be the target object 163 (or be referred to as potential target objects). Then the locating device 120 may determine the target object 163 in the marking image and obtain a target coordinate (or be referred to as a locating coordinate) of the target object 163 under a target coordinate system. Here, a coordinate system may mean a measurement of a scene, such as a perspective of observation of the scene. For example, for a particular scene inside a building, if the camera that takes an image of the scene is mounted on a ceiling of the building, the image may be treated as a measurement of the scene from the camera coordinate, i.e., a coordinate using the center (e.g., optic center) of the image sensor (e.g., CCD or CMOS) of the camera as origin. The target coordinate system may be a coordinate system to measure the objects in the scene from a reference point from the reference point's perspective. For example, the reference point may be a predetermined point in the space, such as a point on the floor of the building.

Figure 3:
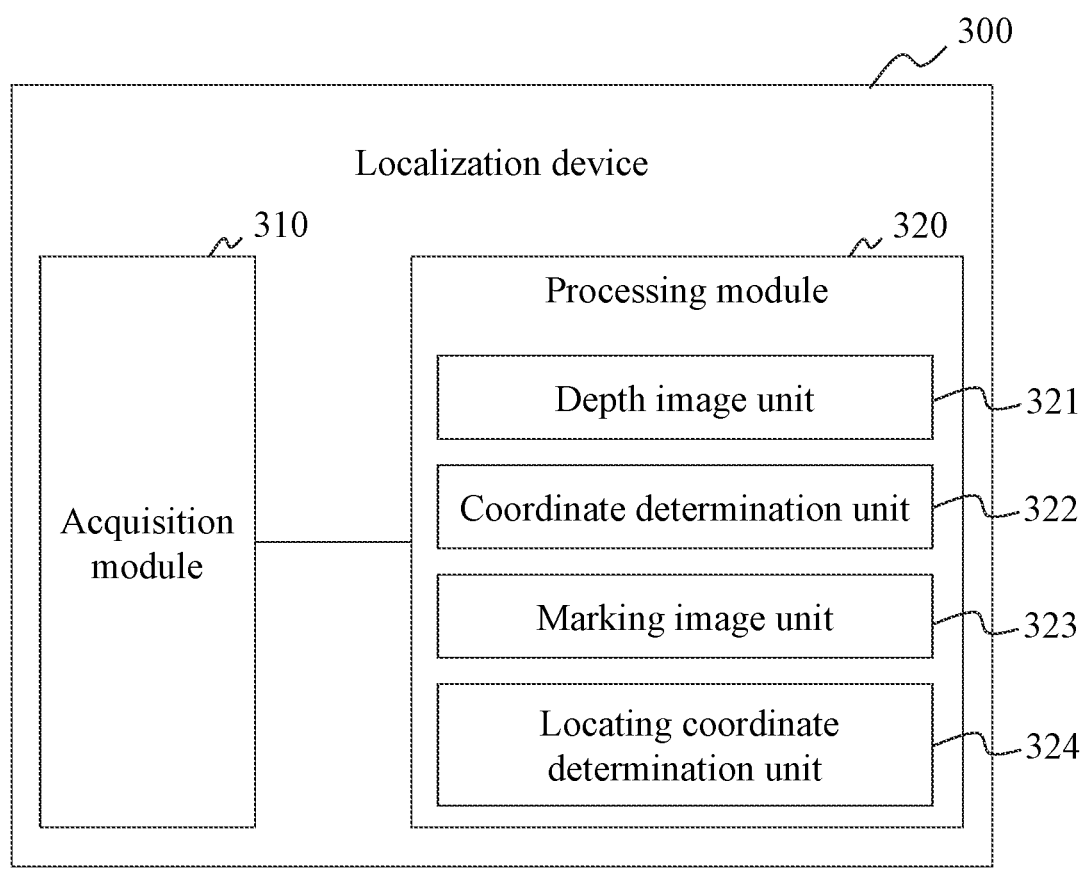
FIG. 3 is a schematic diagram illustrating an exemplary locating device according to some embodiments of the present disclosure.

More description of the locating device 120 and related locating process are provided elsewhere in the present disclosure (e.g., in connection with FIGS. 3, 4, 5).

In some embodiments, the locating device 120 may determine a plurality of target objects 163 in the target scene 161 and obtain a plurality of corresponding locating coordinates.

The locating coordinate(s) obtained by the locating device 120 may be transmitted to the controller 130 for performing one or more follow-up operations or be transmitted to the storage 140 for storage.

The controller 130 may obtain the locating coordinate(s) from the locating device 120 or the storage 140 and perform one or more follow-up operations according to the target coordinate(s). Exemplary follow-up operations may include but not limited to: tracking the target object 163, zooming in and/or focusing the image capturing mechanism 110 towards the target object 163 (e.g., to give the target object 163 a close-up shooting to obtain a featured image 170 of the target object 163), recording the target object 163 (e.g., a stand-up person), changing an image capturing mode of the image capturing mechanism 110 (e.g., to enhance an image quality of one or more obtained images), identifying the target object 163, transmitting an image of the target object 163 to a station (e.g., a police station, a surveillance center) or to a terminal (e.g., a mobile phone, a desktop, a laptop) through the network 150, alarming, controlling a vehicle including the image capturing mechanism 110 so as to avoid the target object 163, or the like, or a combination thereof.

The storage 140 may store data, instructions, and/or any other information. In some embodiments, the storage 140 may store data obtained from the image capturing mechanism 110, the locating device 120, the controller 130, and any other device included in the locating system 100 not shown in FIG. 1. For example, the storage 140 may store data and/or instructions that the locating device 120 may execute or use to perform exemplary methods described in the present disclosure. The storage 140 may include a mass storage device, a removable storage device, a volatile read-and-write memory, a read-only memory (ROM), or the like, or any combination thereof. In some embodiments, the storage 140 may be implemented on a cloud platform.

The image capturing mechanism 110, the locating device 120, the controller 130, and the storage 140 may communicate data and/or information via one or more cables and/or the network 150. The network 150 may include any suitable network that can facilitate the exchange of information and/or data for the locating system 100. The network 150 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a Zig-Bee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the locating system 100 may be connected to the network 150 to exchange data and/or information.

In some embodiments, images obtained by the image capturing mechanism 110 may also be used to generate a stereo image. For example, the locating system 100 may further include an image processing device configured to generate a stereo image according to the images obtained by the image capturing mechanism 100. For example, after the locating device 120 obtain a locating coordinate of the target object 163, the controller 130 may cause the image capturing mechanism 110 to shoot the target object 163 in close-up for obtaining a plurality of featured images 170. The image processing device may process the plurality of featured images 170 and generate a stereo image therefrom.

In some embodiments, the locating system 100 may include a camera (not shown in FIG. 1) configured to obtain a depth image of the target scene directly. The locating device 120 may analyze the depth image obtained by the range camera to determine the locating coordinate of the target object 163 under the target coordinate system. Other image sensor(s) may be optional for the locating of the target object 163. In some embodiments, the image capturing mechanism 110 may only include a range camera. Alternatively, the image capturing mechanism 110 may include a range camera and one or more generally purposed cameras. The range camera is known in the art and descriptions of which are not repeated here.

It should be noted that the above description about the locating system 100 is only for illustration purposes, and is not intended to limit the present disclosure. It is understandable that, after learning the major concept and the mechanism of the present disclosure, a person of ordinary skill in the art may alter the locating system 100 in an uncreative manner. The alteration may include combining and/or splitting modules or sub-modules, adding or removing optional modules or sub-modules, etc. For example, the locating device 120, the controller 130, and/or the storage 140 may be integrated into the image capturing mechanism 100 (e.g., a binocular camera). As another example, the locating device 120 and the controller 130 may also be implemented using a same computing device (e.g., computing device 200 illustrated in FIG. 2). All such modifications are within the protection range of the present disclosure.

FIG. 2 illustrates an exemplary computing device for implementing one or more components of the locating system (e.g., locating device 120, controller 130). For example, the computing device 200 may be configured to perform one or more operations disclosed in the present disclosure. The computing device 200 may include a bus 270, a processor 210, a read only memory (ROM) 230, a random-access memory (RAM) 240, a storage 220 (e.g., massive storage device such as a hard disk, an optical disk, a solid-state disk, a memory card, etc.), an input/output (I/O) port 250, and a communication interface 260. It may be noted that, the architecture of the computing device 200 illustrated in FIG. 2 is only for demonstration purposes, and not intended to be limiting.

In some embodiments, the computing device 200 may be a single device. Alternatively, the computing device 200 may include a plurality of computing devices having a same or similar architecture as illustrated in FIG. 2, and one or more components of computing device 200 may be implemented by one or more of the plurality of computing devices.

The bus 270 may couple various components of computing device 200 and facilitate transferring of data and/or information between them. The bus 270 may have any bus structure in the art. For example, the bus 270 may be or may include a memory bus and/or a peripheral bus.

The I/O port 250 may allow a transferring of data and/or information between the bus 270 and a peripheral device (e.g., components of the locating system 100 such as the image capturing mechanism 110). The I/O port 250 may include a USB port, a COM port, a PS/2 port, an HDMI port, a VGA port, a video cable socket such as an RCA sockets and a Mini-DIN socket, or the like, or a combination thereof.

The communication interface 260 may allow a transferring of data and/or information between the network 150 and the bus 270. For example, the communication interface 260 may be or may include a network interface card (NIC), a Bluetooth™ module, an NFC module, etc.

The ROM 230, the RAM 240, and/or the storage 220 may be configured to store computer readable instructions that can be executed by the processor 210. The RAM 240, and/or the storage 220 may store date and/or information obtained from a peripheral device (e.g., the image capturing mechanism 100) and/or the network 150. The RAM 240, and/or the storage 220 may also store date and/or information generated by the processor 210 during the execution of the instruction. In some embodiments, the ROM 230, the RAM 240, and/or the storage 220 may be or may include the storage 130 illustrated in FIG. 1.

The processor 210 may be or include any processor in the art configured to execute computer readable instructions (e.g., stored in the ROM 230, the RAM 240, and/or the storage 220), so as to perform one or more operations disclosed in the present disclosure. For example, the processor 210 may perform locating of a target object (e.g., the target object 163) in a process illustrated in FIG. 4 or FIG. 5.

FIG. 3 is a schematic diagram illustrating an exemplary locating device according to some embodiments of the present disclosure. Locating device 300 may be an exemplary embodiment of the locating device 120 and may be configured perform locating of a target object (e.g., the target object 163 in FIG. 1) present in a target region (e.g., the target region 161 in FIG. 1) of a target scene (e.g., the target scene 160 in FIG. 1). The locating device 300 may be configured to perform the process illustrated in FIG. 4 and/or FIG. 5.

The locating device 300 may include an acquisition module 310 and a processing module 320. The processing module 320 may include a depth image unit 321, a coordinate determination unit 322, a marking image unit 323, and a locating coordinate determination unit 324. Additional modules and or units may also be included in the locating device 300 for facilitating the locating of the target object. The acquisition module 310, the processing module 320 and the units thereof may be implemented by the processor 210 illustrated in FIG. 2.

The acquisition module 310 may be configured to obtain a first original image and a second original image of the target scene. The first image and the second image may be taken by a first image sensor and a second image sensor of the image capturing mechanism 110 simultaneously. The acquisition unit 501 may obtain the first original image and the second original image from the first image sensor and the second image sensor. Alternatively or additionally, the first original image and the second original image may be temporary stored in a storage device (e.g., the storage 140, the storage 220, the RAM 240) and the acquisition unit 501 may obtain the first original image and the second original image from the storage device.

The acquisition unit 501 may obtain the first original image and the second original image via a communication module (e.g., the bus 270, the I/O port 250, and/or the communication interface 260) of the locating device 300. For example, the acquisition unit 501 may receive first electronic signals including the first image and second electronic signals including the second image via the communication module.

In some embodiments, the acquisition module 310 may be configured to acquire two original images of the target scene respectively taken by a left camera and a right camera of a binocular camera (the image capturing mechanism 110).

In some embodiments, the acquisition unit 310 may directly obtain a depth image taken by a range camera.

The processing module 320 may be configured to perform operations described as following.

The processing module 320, or the depth image unit 321 may obtain a depth image of the target scene. The processing module 320, or the depth image unit 321, may generate a depth image of the target scene according to the original images obtained by the acquisition unit 310. Alternatively, the processing module 320, or the depth image unit 321, may directly obtain a depth image taken by a range camera from the acquisition unit 310. Gray values of pixels of the depth image may represent a distance to points in the target scene 160 corresponding to the pixels of the depth image from a point associated with the image capturing mechanism 110.

In some embodiments, the processing module 320, or the depth image unit 321, may determine a depth image according to two original images obtained by a binocular camera. A gray value of any pixel in the depth image may be a value of a horizontal parallax (e.g., the parallax in a direction of the XI axis illustrated in FIG. 6) between pixels corresponding to a target actual position in the two original images. The target actual position may be an actual position corresponding to the pixels of the depth image in the target scene.

The processing module 320, or the coordinate determination unit 322, may determine a coordinate (or be referred to as a first target coordinate) of an actual position corresponding to each of a plurality of pixels of the depth image under a target coordinate system. The target coordinate system may be a three-dimensional coordinate system describing actual positions of objects showed by the depth image and/or the original images in the target scene. The plurality of pixels may be all the pixels of the depth image, pixels corresponding to the target region, or pixels determined by performing a sampling technique upon the depth image.

In some embodiments, the processing module 320, or the coordinate determination unit 322, may determine a three-dimensional coordinate of an actual position corresponding to each pixel of the depth image under the target coordinate system;

The processing module 320, or the marking image unit 323, may generate a marking image (or mask) according to the depth image. The marking image may represent potential target objects in the depth image. The processing module 320, or the marking image unit 323 may determine an identification range (e.g., preset range for identification) in the depth image and generate the marking image according to a position (or image coordinate) distribution of the pixels within the identification range (preset range for identification). The identification range may correspond to the whole target region or a part of the target region without an interferent (or at least a majority of it). In some embodiments, the processing module 320 may determine an interference range represents a region of the target scene including one or more interferents. The processing module 320 may determine the identification range according to the interference range and the target region, and the identification range may not overlap with the interference range.

In some embodiments, the processing module 320, or the marking image unit 323, may sift out (e.g., select and/or identify) and/or select first target pixels from the depth image and generate a marking image according to position (or image coordinate) distribution of the first target pixels in the depth image. The three-dimensional coordinates of actual positions corresponding to the first target pixels under the target coordinate system may be within the preset range (e.g., an identification range/range). The marking image may include a plurality of second target pixels corresponding to the first target pixels. Gray values of the second target pixels in the marking image may be first gray values, gray values of other pixels in the marking image may be second gray values. The second target pixels, of which the position (or image coordinate) in the marking image may be the same as the position (or image coordinate) of the first target pixels in the depth image, may have a gray value as the first gray value.

The processing module 320, or the locating coordinate determination unit 324, may determine at least one connected component (or be referred to as connected region or connected domain) in the marking image. Any pixel in a connected component may be adjacent to at least one other pixel in the same connected component. A pixel in the connected component and which is adjacent to any one of the pixels in the connected component may have a gray value within a preset gray value range. The preset gray value range may include the first gray value(s) but not the second gray value(s). To put it in other words, the connected component may have a plurality of pixels adjacent with each other. The gray values of all the pixels in the connected component may be within the preset gray value range. The preset gray value range includes the first gray value(s) but excludes the second gray value(s).

The processing module 320, or the locating coordinate determination unit 324, may identify those connected components that are large enough, and then identify the center points of these identified connected components, and then treat the 3D target coordinates of the center points as the coordinates of the target objects in the target scene.

For example, the processing module 320, or the locating coordinate determination unit 324, may sift out (e.g., select and/or identify) a target connected component with a number of pixels greater than or equal to a preset threshold from the at least one connected component, determine a locating point in the marking image according to the target connected component; and determine the locating coordinate according to an image coordinate of the locating point (second image coordinate).

In some embodiments, the locating point may be a center of the target connected component. The processing module 320, or the locating coordinate determination unit 324, may designate a three-dimensional coordinate (or be referred to as a fourth target coordinate) of an actual position corresponding to a center of the target connected component under the target coordinate system as the three-dimensional coordinate (locating coordinate) of the target object in the target scene.

In some embodiments, to generate the depth image according to the first image and the second image, the processing module 320, or the depth image unit 321 may be configured to perform a process described as following.

For each pixel in the first original image (i.e., any one of the two original images), the processing module 320, or the depth image unit 321, may determine a horizontal parallax between the pixel of the first original image and a corresponding pixel of the second original image.

Next, for each pixel in the first original image, the processing module 320, or the depth image unit 321, may assign the corresponding horizontal parallax value to the pixel as its gray scale value (gray value), and thereby generating the depth image. In other words, the processing module 320, or the depth image unit 321, may perform the following operation with respect to the horizontal parallax determined for each pixel in the first original image: taking the horizontal parallax determined for the pixel as a gray value of a pixel having a same position in the depth image as the position of the pixel in first original image, and then generate the depth image according to the gray value of each pixel in the depth image.

In some embodiments, to determining a three-dimensional coordinate (first target coordinate) of the actual position corresponding to each of the plurality of pixels in the depth image under the target coordinate system, the processing module 320, or the coordinate determination unit 322, may be configured to perform a process described as following.

The processing module 320, or the coordinate determination unit 322, may determine a three-dimensional coordinate (sensor or camera coordinate) for each of the plurality of pixels under a sensor coordinate system with respect to the first image sensor according to an image coordinate and a gray value of each of the plurality of pixels. In some embodiments, the first image sensor may belong to a binocular camera, the first image sensor may be a left camera or a right camera of the binocular camera, correspondingly, the camera and/or sensor coordinate system may be a camera coordinate system of the left camera or the right camera.

The processing module 320, or the coordinate determination unit 322, may also determine a three-dimensional coordinate (the first target coordinate) of the actual position corresponding to each of the plurality of pixels under the target coordinate system according to the three-dimensional coordinate (sensor and/or coordinate) of each of the plurality of pixels under the sensor coordinate system.

In some embodiments, the identification range (preset range for identification) may be a three-dimensional coordinate range within which a target object in the target scene may actually be (or be predicted to be) under the target coordinate system.

In some embodiments, to generate the marking image, the processing module 320, or the marking image unit 323, may be configured to perform a process described as following.

The processing module 320, or the marking image unit 323, may determine at least one interferent (object that disrupts, or causes interference to the detection of the target object) in the target scene (or disrupting pixels in the depth image) and determine a three-dimensional coordinate (or be referred to as a second target coordinate) of the at least one interferent (or each of the disrupting pixels) under the target coordinate system;

The processing module 320, or the marking image unit 323, may also determine an interference range in the target scene according to the three-dimensional coordinate(s) (second target coordinates) of the at least one interferent (or disrupting pixels) under the target coordinate system;

The processing module 320, or the marking image unit 323, may further determine an identification range (preset range) in the target scene according to the interference range (disrupt range) and the target region, wherein the identification range does not overlap with the interference range.

The processing module 320, or the marking image unit 323, may also sift out (e.g., select and/or identify) pixels of which the corresponding actual positions have three-dimensional coordinates under the target coordinate system (or be referred to as third target coordinates) in the identification range in the depth image. The pixels sifted out may be designated as the first target pixels.

In some embodiments, the processing module 320, or the marking image unit 323, may generate the marking image from the depth image. Specifically, the processing module 320 may do so by assigning and/or designating the first target pixels with the first gray values, thereby making these pixels the second target pixels. For the rest of other pixels, the processing module 320, or the marking image unit 323 may further designate and/or assign second gray values.

In some embodiments, to determine the target coordinate of the target object according to the marking image, the processing module 320, or the locating coordinate determination unit 324, may determine a target connected component in the marking image. The processing module 320, or the locating coordinate determination unit 324, may also determine a locating point in the marking image according to the target connected component, and determine the locating coordinate according to a second image coordinate of the locating point.

In some embodiments, to determine the target connected component in the marking image, the processing module 320, or the locating coordinate determination unit 324, may determine at least one connected component in the marking image, and sift out (e.g., select and/or identify) a connected component having a number of pixels greater than or equal to a preset threshold from the at least one connected component as the target connected component.

It may be noted that, the above descriptions about the locating device 300 are only for illustration purposes, and are not intended to limit the present disclosure. It is to be understood that, after learning the major concept and the mechanism of the present disclosure, a person of ordinary skill in the art may alter the locating device 300 in an uncreative manner. The alteration may include combining and/or splitting modules or units, adding or removing optional modules or units, etc. All such modifications are within the protection range of the present disclosure.

FIG. 4 is a schematic diagram illustrating an exemplary locating process according to some embodiments of the present disclosure. Process 400 may be performed by the locating module 300 for locating a target object (e.g., the target object 163) appeared in a target region (e.g., target region 161) of a target scene (e.g., the target scene 160). In some embodiments, one or more operations of process 400 illustrated in FIG. 4 may be implemented in the locating system 100 illustrated in FIG. 1. For example, the process 400 illustrated in FIG. 4 may be stored in the storage 130 in the form of instructions, and invoked and/or executed by the locating device 140 or the locating module 141. One or more operations of the process 400 may be performed by the processor 210 of the computing device 200 as illustrated in FIG. 2 which implements the locating device 140 or the locating module 141.

In step 410, the processor 210, or the depth image unit 321, may obtain a depth image of the target scene. The depth image may include a plurality of pixels. The depth image may represent distances to points in the target scene corresponding to the pixels of the depth image from a reference point associated with an image capturing mechanism (e.g., the image capturing mechanism 110) contribute to the generating of the depth image. For example, when the image capturing mechanism includes a plurality of cameras, the reference point may be an optical point of one of the plurality of cameras or be determined according to optical points of all the plurality of cameras. As another example, when the image capturing mechanism is a range camera, the reference point may be an optical point or a base point of the range camera.

In some embodiments, the image capturing mechanism may include a plurality of image sensors (e.g., cameras), each of which may obtain an original image of the target scene. The processor 210, or the depth image unit 321, may generate the depth image according to the obtained original images of the target scene. For example, the image capturing mechanism may include a first image sensor and a second image sensor configured to obtain a first image and a second image of the target scene simultaneously. The processor 210, or the depth image unit 321, may receive first electronic signals including the first image and second electronic signals including the second image through the acquisition module 310 and generate the depth image according to the first image and the second image.

In some embodiments, the processor 210, or the depth image unit 321, may determine, for each pixel of the first image, a horizontal parallax between each pixel of the first image and a corresponding pixel of the second image. The processor 210, or the depth image unit 321, may then determine a gray value for each pixel of the depth image according to the horizontal parallax determined for a corresponding pixel of the first image.

In some embodiments, the image capturing mechanism may include a range camera configured to obtain a depth image directly. The image capturing mechanism may optionally include additional image sensors which may be involved in follow-up operations after the locating coordinate of the target object is obtained. The processor 210, or the depth image unit 321, may receive electronic signals including the directly obtained depth image. The directly obtained depth image may be subject to the next step of the process 400. Optionally, the depth image unit 321 may preprocess (e.g., denoise, crop) the depth image.

In step 420, for each of the plurality of pixels of the depth image, the processor 120, or the coordinate determination unit 322, may determine a first target coordinate under a target coordinate system. The plurality of pixels may be all the pixels of the depth image, pixels corresponding to the target region, or pixels determined by performing a sampling technique upon the depth image.

Figure 6:
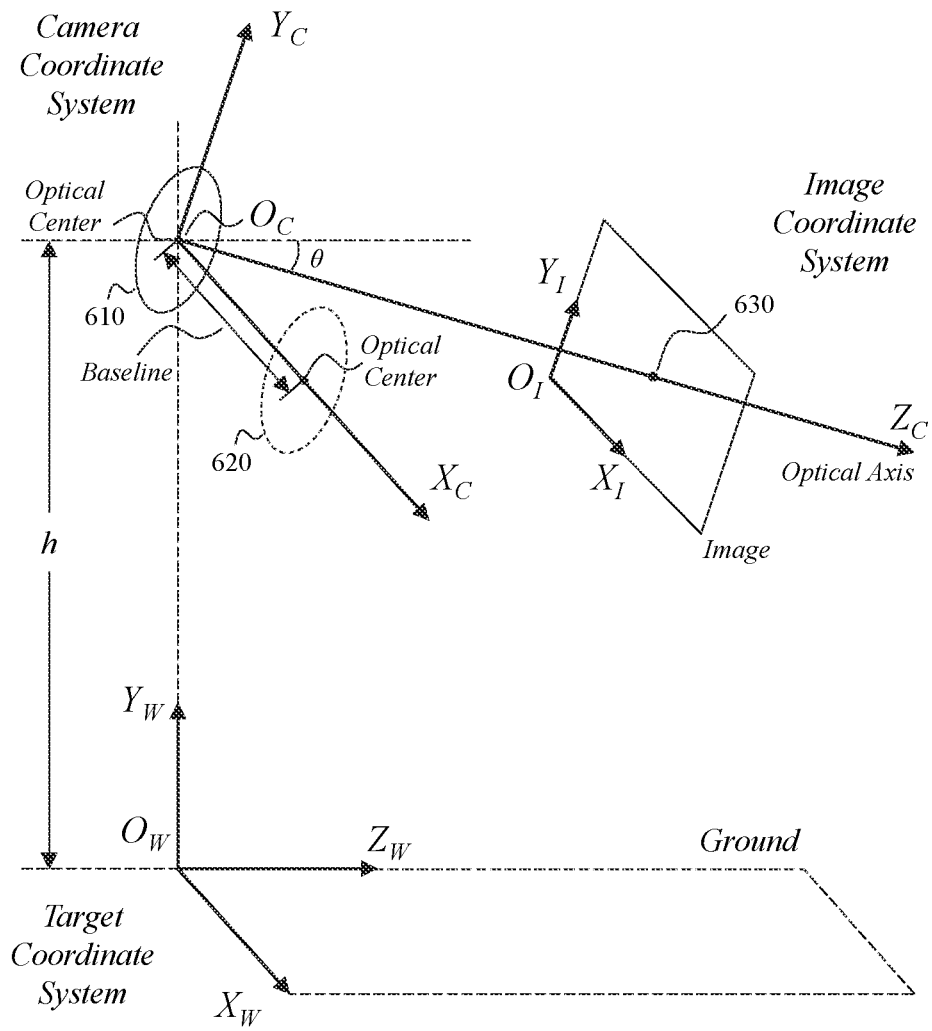
FIG. 6 is a schematic diagram illustrating exemplary relationships among an image coordinate system, a camera coordinate system, a target coordinate system according to some embodiments of the present disclosure.

A target coordinate system may be a coordinate system describing actual positions (or points) corresponding to pixels of an image (e.g., the depth image and/or the original images) with respect to a scene showed by the image (e.g., the target scene). The first target coordinate may be a three-dimensional coordinate of an actual position corresponding to each of the plurality of pixels of the depth image under the target coordinate system. For demonstration purposes, exemplary relationships among an image coordinate system (a coordinate system describing a position of a pixel in an image), a sensor coordinate system (a coordinate system describing actual positions (or points) corresponding to pixels of an image with respect to an image sensor taking the image), and a target coordinate system are illustrated in FIG. 6. When the image sensor for taking the image is a camera (e.g., a left camera or a right camera of a binocular camera), the sensor coordinate system may also be referred to as a camera coordinate system.

The processor 120, or the coordinate determination unit 322, may obtain the plurality of first target coordinates according to the relationships among the three coordinate systems. In some embodiments, the depth image obtained in step 410 may be generate according to a first image taken by a first image sensor and a second image taken by a second image sensor. The processor 120, or the coordinate determination unit 322, may determine a sensor coordinate for each of the plurality of pixels under a sensor coordinate system with respect to, for example, the first image sensor, according to a first image coordinate and a gray value of each of the plurality of pixels. A first image coordinate may be an image coordinate of a pixel in the depth image under an image coordinate system $X_I$-$Y_I$ as illustrated in FIG. 6. The processor 120, or the coordinate determination unit 322, may then determine the first target coordinate according to the sensor coordinate of each of the plurality of pixels.

In some embodiments, the depth image obtained in step 410 may be taken by a range camera. The sensor coordinate system may be with respect to an optical center, or a base point, of the range camera.

An exemplary process for determining the first target coordinate are described elsewhere in the present' disclosure (e.g., the operations (b1) and (b2) in step 520 of the process 500 illustrated in FIG. 5), which is only for demonstration purposes and not intended to be limiting.

In step 430, the processor 120, or the marking image unit 323, may generate a marking image according to the depth image and the first target coordinates of the plurality of pixels in the depth image. The marking image may represent potential target objects in the depth image. For example, the pixels having first gray values in the marking image may represent the potential target objects in the target scene, and the pixels having second gray values in the marking image may represent a background (e.g., objects of no interest) of the target scene.

The first gray values or the second gray values may be equal to a certain value or include a value range. For example, the first gray values may all be 200 (or any other proper value) and the second values may all be 0 (or any other proper value not covered by the first gray values). As another example, the first gray values may cover a value range between 200 and 255. In some embodiments, the first gray values may be determined further on the gray values of the depth image.

In some embodiments, to generate the marking image, the processor 120, or the marking image unit 323, may determine one or more interferents (e.g., in the form of a collection of pixels which may be referred to as disrupting pixels) in the target region. The processor 120, or the marking image unit 323, may determine a second target coordinate for each of the disrupting pixels to obtain a plurality of second target coordinates. The second target coordinates may be three-dimensional coordinates of actual position in the target scene corresponding to the disrupting pixels under the target coordinate system. The processor 120, or the marking image unit 323, may determine an interference range in the target scene according to the second target coordinates and the target region, and then determine an identification range (preset range for identification) in the target scene according to the interference range and the target region. The identification range may not overlap with the interference range. The processor 120, or the marking image unit 323, may sift out (e.g., select and/or identify) first target pixels having third target coordinates within the identification range in the depth image and generate the marking image according to the first target pixels. The marking image may include second target pixels corresponding to the first target pixels. The second target pixels may have first gray values, and other pixels in the marking image have second gray values. One of the first target pixels in the depth image and one of the second target pixels in the marking image may have a same position (or image coordinate).

In some embodiments, the plurality of the pixels for determining the first target coordinates may correspond to the target region. The identification range (preset range for identification) may be determined by excluding disrupting pixels from the plurality of the pixels. In some embodiments, the plurality of the pixels for determining the first target coordinates may be all the pixels of the depth image, the identification range may be determined by first determining pixels corresponding to the target region, then exclude the disrupting pixels form the determined pixels. In some embodiments, the processor 120, or the marking image unit 323, the marking image may be generated according to all pixels corresponding to the target region in the depth image without excluding disrupting pixels.

In step 440, the processor 210, or the locating coordinate determination unit 324, may determine a locating coordinate of the target object under the target coordinate system according to the marking image. For example, the processor 210, or the locating coordinate determination unit 324, may determine a target connected component representing the target object in the marking image, and determine a locating point in the marking image according to the target connected component. The processor 210, or the locating coordinate determination unit 324, may then determine the locating coordinate according to a second image coordinate of the locating point. The processor 210, or the locating coordinate determination unit 324, may first determine at least one connected component in the marking image, and then sift out (e.g., select and/or identify) the target connected component from the at least one connected component.

In some embodiments, to determine the target connected component, the processor 210, or the locating coordinate determination unit 324, may first determine at least one connected component in the marking image, and sift out (e.g., select and/or identify) a connected component having a number of pixels greater than or equal to a preset threshold from the at least one connected component as the target connected component. The preset threshold may be set according to a possible size of the target object.

In some embodiments, the type of the target object may be predetermined. To determine the target connected component, the processor 210, or the locating coordinate determination unit 324, may perform an image recognition upon the marking image, the depth image, and/or the original images for generating the depth image, for recognizing an object corresponding to the at least one connected component. The target connected region may be determined according to the recognition result. For example, the image recognition may be according to the shape and/or gray values of pixels of the at least one connected component.

In some embodiments, the processor 210, or the locating coordinate determination unit 324, may denoise the marking image before determining the target connected component. The image denoising may be performed in any process in the art. An exemplary process is provided elsewhere in the present disclosure (e.g., operations (d1) to (d4) in the step 540 of process 500 illustrated in FIG. 5).

The locating point may be a point indicating a position of the target object in the marking image, the depth image, or the first original image. In some embodiments, the locating point may be a central pixel of the target connected component. In some embodiments, the locating point may be determined according to the shape and/or the recognition result of the target connected component. For example, the locating point may be determined so that it may be a center of head or face of a stand-up person.

In some embodiments, after the target connected component is determined, the processor 210, or the locating coordinate determination unit 324 may segment the depth image and/or the original images according to the target connected component. For example, the target connected component may be used to determine seed points and/or thresholds for the image segmentation. The locating point may be determined according to the image segmentation result.

The locating coordinate under the target coordinate system may be determined according to an image coordinate of the locating point.

In some embodiments, after the locating coordinate is determined, the locating device 300 may transmit the locating coordinate to a controller (e.g., the controller 130) to perform one or more follow-up operations. For example, the locating device 300 may transmit third electronic signals including the locating coordinate to the controller. The controller, upon receiving the third electronic signals, may transmit a control signal to the image capturing mechanism (e.g., the image capturing mechanism 110) for generating the original images or the depth image, causing the image capturing mechanism perform a corresponding operation. For example, the image capturing mechanism (e.g., a binocular camera) may include a first image sensor and a second image sensor. The control signal may cause at least one the first image sensor and the second image sensor to be focused or zoomed in towards the locating target coordinate.

It may be noted that the above descriptions of locating of the target object are only for demonstration purposes and not intended to be limiting. It is to be understood that, after learning the major concept and the mechanism of the present disclosure, a person of ordinary skill in the art may alter process 400 in an uncreative manner. For example, the operations above may be implemented in an order different from that illustrated in FIG. 4. One or more optional operations may be added to process 400. One or more operations may be divided or be combined. All such modifications are within the protection range of the present disclosure.

FIG. 5 is a schematic diagram illustrating an exemplary locating process according to some embodiments of the present disclosure. Process 500 may be performed by the locating module 300 to achieve the process 400 illustrated in FIG. 4. In some embodiments, one or more operations of process 500 illustrated in FIG. 5 may be implemented in the locating system 100 illustrated in FIG. 1. For example, the process 500 illustrated in FIG. 5 may be stored in the storage 130 in the form of instructions, and invoked and/or executed by the locating device 140 or the locating module 141. One or more operations of the process 500 may be performed by the processor 210 of the computing device 200 as illustrated in FIG. 2 which implements the locating device 140 or the locating module 141. The process 500 may include:

Step 510: the processor 210, or the depth image unit 321, may obtain two original images of a target scene respectively taken by a left camera (e.g., left camera 610 illustrated in FIG. 6) and a right camera (e.g., left camera 620 illustrated in FIG. 6) of a binocular camera, and determine a depth image according to the two original images. Step 510 may be performed to achieve step 410 of process 400 illustrated in FIG. 4.

The depth image may be a gray scale image with a plurality of pixels. Each pixel in the depth image corresponds to a pixel in one of the original images (either the left image or the right image). Further, the value (gray value or gray scale value) of each pixel in the depth image may be determined according to a horizontal parallax (e.g., the parallax along the direction of the XI axis as illustrated in FIG. 6) between pixels corresponding to a target actual position in the two original images. For example, a value of the horizontal parallax (e.g., measured in pixels, distance, degrees, or radians) may be set as a gray value of a corresponding pixel in the depth image. The target actual position may be an actual position corresponding to the pixel of the depth image in the target scene. Accordingly because each the pixels in the original image is kept in the same position in the depth image, the depth image maintains the position information of every object in the original image. Further, because the gray value of each pixel represents a distance of a corresponding points on the objects from the camera, the depth image includes position information of the objects in a 3-D space.

In some embodiments, before shooting the target scene using the binocular camera, a user may install the binocular camera at a place as high as possible (but reasonably), so that a field of view (FOV) of the binocular camera may cover the location of the target scene. A baseline (e.g., as illustrated in FIG. 6) of the binocular camera may be made to be parallel with the ground (e.g., along the direction of the Xc axis as illustrated in FIG. 6), wherein the baseline of the binocular camera is a linear segment between lenses (optical centers of the lenses) of the left camera and the right camera of the binocular camera. After installation, the left camera and the right camera of the binocular camera may shoot the target scene respectively, and two original images may be generated. The two original images may include a first original image and a second original image. The first original image may be taken by the left camera and the second original image may be taken by the right camera, or vice versa.

In some embodiments, after the processor 210, or the depth image unit 321, obtains the two original images of the target scene respectively captured by the left camera and the right camera of the binocular camera, the processor 210 (or the depth image unit 321) may determine the depth image according to the two original images. In some detailed embodiments, the determination may include a three-step process described as following:

(a1) The processor 210, or the depth image unit 321, may determine, for each pixel of the first original image, a horizontal parallax between corresponding pixels in the two original images. The corresponding pixels may correspond to an actual position corresponding to each pixel. The pixels in the two original images may correspond to a target actual position where each pixel corresponds to. The first original image may be any one of the two original images.

(a2) For the horizontal parallax determined for each pixel of the first original image, the processor 210, or the depth image unit 321, may take the value of the horizontal parallax (or a parameter generated therefrom) determined for each pixel in (a1) as a gray value of a corresponding pixel for the depth image. The pixel for the depth image may be set as having a same position (or image coordinate) as each pixel in the first original image; and (a3) The processor 210, or the depth image unit 321, may generate the depth image according to the gray value of each pixel for the depth image.

In some embodiments, in aforementioned step (a1), the horizontal parallax may also be referred to as depth. For determining the horizontal parallax between pixels in the two original images corresponding to each pixel in the first original image, the processor 210 may adopt an algorithm including but not limited to a Boyer-Moore (BM) algorithm, a Semi-Global Block Matching (SGBM) algorithm, or any algorithm for obtaining the depth in the art, or a combination thereof.

In some embodiments, after the depth image is generated according to the aforementioned step, a position (or image coordinate) of a pixel in the depth image may correspond to a position (or image coordinate) of a pixel in the first original image.

Step 520: from the above description, the target scene may include one or more objects. Each pixel in the original image may correspond to a point on the surface of the one or more objects. The pixels in the original image may one-to-one correspond to the pixels in the depth image. In this step, for each pixel in the depth image, the processor 210 and/or the coordinate determination unit 322 may further determine the actual position of the point corresponding to the pixel under a target coordinate system. In other words, the processor 210, and/or the coordinate determination unit 322, may further determine a three-dimensional coordinate (first target coordinate) of the actual position corresponding to each pixel of the depth image under a target coordinate system (e.g., as illustrated in FIG. 6). Step 520 may be performed to achieve step 420 of process 400.

In some embodiments, the processor 210, and/or the coordinate determination unit 322, may determine the above three-dimensional coordinate in a two-step process described as following:

(b1) The processor 210, or the coordinate determination unit 322, may determine a three-dimensional coordinate (camera coordinate) for each pixel of the depth image under a camera coordinate system (the coordinate set on the camera of the original image) according to a coordinate (image coordinate, the coordinate of the pixel in the depth image) of each pixel of the depth image under an image coordinate system and the gray value of each pixel. The camera coordinate system may be a coordinate system of the left camera or a coordinate system of the right camera. In other words, for each pixel in the depth image, the processor 210 and/or the coordinate determination unit 322 may take its coordinate in the depth image and determine and/or calculate the corresponding object surface point's coordinate in the camera's coordinate system.

As described in step 510, the position (or image coordinate) of a pixel in the depth image may correspond to the position (or image coordinate) of a pixel in the first original image, and the first original image may be any one of the two original images. Merely for demonstration purposes, the present invention may be described in detail by designating the original image taken by the left camera as the first original image.

In some embodiments, when the first original image is the original image taken by the left camera, the camera coordinate system may be the coordinate system of the left camera (e.g., as illustrated in FIG. 6). In the camera coordinate system XC-YC-ZC, the origin is an optical center of the left camera; the XC axis and YC axis of the camera coordinate system are parallel to the XI axis and YI axis of the original image taken by the left camera, respectively; the ZC axis of the camera coordinate system is an optical axis of the left camera. Herein, each pixel in the depth image may have a three-dimensional coordinate (px,py,pz) in the camera coordinate system satisfying Equation (1), which may be expressed as:

$$\begin{Bmatrix} px = b*(i-u)/d \\ py = b*(j-v)/d \\ pz = b*f/d \end{Bmatrix} \qquad \text{Equation (1)}$$

wherein, b is a length of the baseline distance of the binocular camera; i is a horizontal coordinate (e.g., the $X_I$ coordinate) of the pixel; j is a vertical coordinate (e.g., the $Y_I$ coordinate) of the pixel; u is a horizontal coordinate of a center pixel (e.g., pixel 630) of the depth image; v is a vertical coordinate of the center pixel of the depth image; d is a gray value of the pixel; and f is a focal length of the left camera.

(b2) According to the three-dimensional coordinate of each pixel in the camera coordinate system, the processor 210, or the coordinate determination unit 322, may determine a three-dimensional coordinate of the actual position corresponding to each pixel under the target coordinate system, i.e., for each pixel in the depth image (thus for each pixel in the first original image as well), the processor 210 and/or the coordinate determination unit 322 may determine the actual position of the corresponding point on the one or more objects in the target scene, and determine the coordinate of the point in the current target coordinate (e.g., the target coordinate, and/or an actual coordinate system to be used for later procedures that measures the location of the one or more object).

In some embodiments, when the first original image is the original image taken by the left camera, a reference point (a projection of the optical center of the left camera on the ground alone a vertical line) may be set as an origin (e.g., Ow) of the target coordinate system, the ground may be taken as an $X_w Z_w$ plane, a vertical line from the optical center of the left camera to the ground may be set as an $Y_w$ axis, and a projection of the optical axis of the left camera on the ground may be set as the $Z_w$ axis.

The processor 210, or the coordinate determination unit 322, may determine a three-dimensional coordinate of the actual position corresponding to each pixel under the target coordinate system according to the three-dimensional coordinate of each pixel in the camera coordinate system determined in step (b1). The three-dimensional coordinate (pxw, pyw,pzw) under the target coordinate system may satisfy Equation (2), which may be expressed as:

$$\begin{cases} pxw = px \\ pyw = \cos\theta * py - \sin\theta * pz + h \\ pzw = -\sin\theta * py + \cos\theta * pz \end{cases}$$ Equation (2)

wherein, θ is an installation pitch angle of a binocular camera with unchangeable pitch angle; and h is an installation height (e.g., with respect to the optical center and ground) of the binocular camera with unchangeable height. The installation pitch angle and/or the installation height may be the pitch angle and/or the height of the binocular camera (with unchangeable pitch angle and/or height) set by an installer of the binocular camera. However, for a binocular camera with changeable pitch angle and/or height, θ and/or h may be a pitch angle and/or height (e.g., as illustrated in FIG. 6) of the binocular camera when the two original images are captured.

In some embodiments, as the ground is taken as the $X_wZ_w$ plane under the target coordinate system, the aforementioned pyw may be considered as a height (e.g., h) of the optical center of the binocular camera with respect to the ground.

As described above, starting from two original images shot by a binocular camera, the methods and systems in the present disclosure may transform the original images into a gray scale depth image, which is further used to determine objects' position in the target coordinate system (i.e., the target coordinate, also the target space and viewing angle). Next, the methods and systems in the present disclosure may further identify target objects in the target space through the target image.

Step 530: the processor 210, or the marking image unit 323, may sift out (e.g., select and/or identify) first target pixels from the depth image and generate a marking image (or mask) according to a position (or image coordinate) distribution of the first target pixels in the depth image. The three-dimensional coordinates of actual positions corresponding to the first target pixels under the target coordinate system (or be referred to as word coordinates of the first target pixels) may be within an identification range (preset range for identification). The marking image may include a plurality of second target pixels corresponding to the first target pixels. Gray values of the second target pixels in the marking image may be a first gray value, gray values of other pixels in the marking image may be a second gray value. For example, the second target pixels, of which the position (or image coordinate) in the marking image may be the same as the position (or image coordinate) of the first target pixels in the depth image, may have a gray value as the first gray value. Step 530 may be performed to achieve step 430 of process 400.

In some embodiments, the identification range may be a three-dimensional coordinate range within which a target object in the target scene may actually be under the target coordinate system.

When the target object is an object of a different type, the identification range may be varied accordingly. For example, when the target is a stand-up person (generally be identified by performing a face recognition on the stand-up person in the art), since a height distribution range of the face of the stand-up person may be between 1.3 meters and 2.0 meters, a three-dimensional coordinate range of an actual position of the face of the stand-up person in the target scene may be a three-dimensional coordinate range with a pyw between 1.3 and 2.0 under the target coordinate system. As another example, when the target object is a desktop of a desk, since a height distribution range of a desktop of the desk is between 0.5 meter and 1.2 meters, a three-dimensional coordinate range of an actual position of the desktop of the desk in the target scene may be a three-dimensional coordinate range with a pyw between 0.5 and 1.2 (e.g., in the unit of meter) in the three-dimensional coordinate.

In some embodiments, the processor 210, or the marking image unit 323, may sift out (e.g., select and/or identify) the first target pixels from the depth image. The sifting may include a four-step process described as following:

(c1) The processor 210 may determine at least one interferent in the target scene (or disrupting pixels in the depth image) and determine a three-dimensional coordinate (or be referred to as a second target coordinate) of the at least one interferent (or each of the disrupting pixels) under the target coordinate system.

For example, when the target is a stand-up person, relatively high objects such as a wall in the target scene may interfere with the locating of the stand-up person according to the height distribution of face of the stand-up person. Therefore, it may be needed to locate at least one interferent that may interfere with the locating of the stand-up person so as to avoid the interference. In some embodiments, a process for determining the at least one interferent in the target scene and determining the three-dimensional coordinate of the at least one interferent under the target coordinate system may include operations as following:

The processor 210, or the marking image unit 323, may obtain two background original images of the same target scene without the stand-up person captured by the binocular camera and determine (or generate) a background depth image without the stand-up person according to the two background original images.

The processor 210, or the marking image unit 323, may determine a three-dimensional coordinate of an actual position corresponding to each pixel of the background depth image under the target coordinate system through the process described in step 520.

The processor 210, or the marking image unit 323, may refer to the height distribution range of the face of the stand-up person and determine at least one disrupting pixel in the background depth image. An object at an actual position corresponding to the at least one disrupting pixel may be identified as the at least one interferent. The processor 210, or the marking image unit 323, may also determine a three-dimensional coordinate of the at least one interferent under the target coordinate system. The three-dimensional coordinate of the actual position corresponding to the at least one disrupting pixel under the target coordinate system may have a YW coordinate pywl within a height range of the stand-up person. For example, the three-dimensional coordinate of the interferent may satisfy 1.3<pywl<2.0 (e.g., in the unit of meter).

(c2) The processor 210, or the marking image unit 323, may determine an interference range in the target scene (e.g., target scene 160 in FIG. 1) according to the three-dimensional coordinate(s) (second target coordinates) of the at least one interferent (or disrupting pixels) under the target coordinate system.

Figure 7:
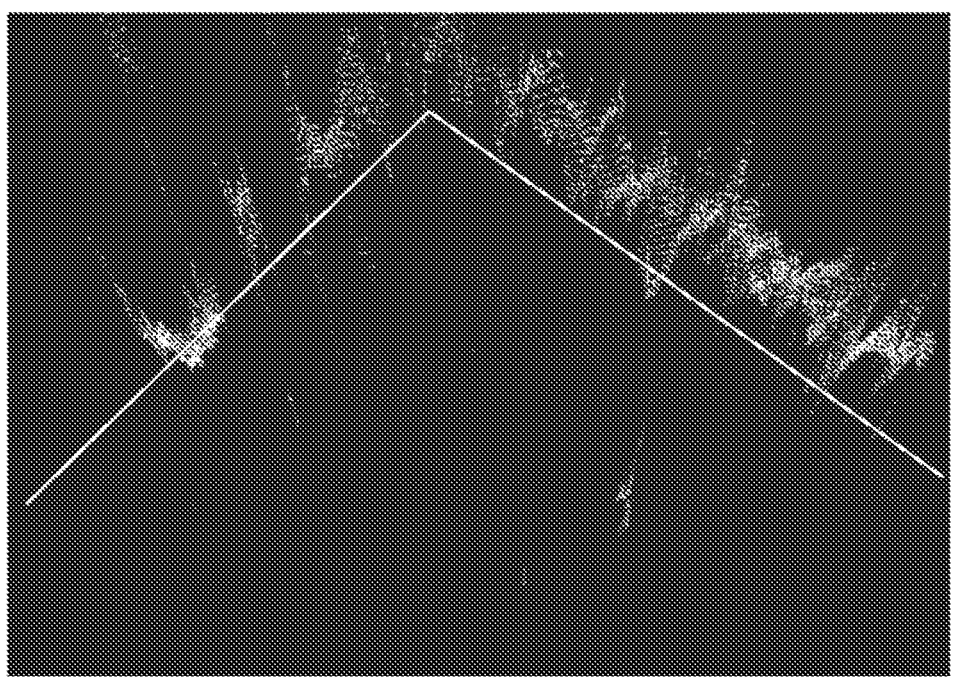
FIG. 7 is a schematic diagram illustrating an exemplary background marking image according to some embodiments of the present disclosure.

In the aforementioned example, optionally, a process for determining the interference range may include:

When the three-dimensional coordinate of the at least one interferent satisfies 1.3<pywl<2.0, the processor 210, or the marking image unit 323, may set an XW coordinate of the three-dimensional coordinate as a horizontal coordinate (e.g., XI coordinate) of a corresponding pixel in the background marking image, and set a ZW coordinate of the three-dimensional coordinate as a vertical coordinate (e.g., YI coordinate) of a corresponding pixel in the background marking image, thereby the position (or image coordinate) of the at least one interferent in the background marking image may be determined. For demonstration purposes, FIG. 7 illustrates an exemplary background marking image. At least one pixel of the at least one interferent in the background marking image may be set to have a gray value of 255 or any other gray value approximate to a gray value of white. Other pixels of the background marking image may be set to have a gray value of 0 or any other gray value approximate to a gray value of black. Thereby the background marking image illustrated in FIG. 7 may include at least one white pixel indicating the position (or image coordinate) of the at least one interferent in the background marking image.

It may be noted that, the background marking image may also take any other proper forms or use any other proper colors (or color system) to distinguish the interferent(s) and other elements of the target scene.

The processor 210, or the marking image unit 323, may then determine an interference range according to the background marking image. For example, the processor 210 may mark three-dimensional coordinates of actual positions corresponding to some or all of the white pixels in the background marking image as the interference range. As another example, the processor 210, or the marking image unit 323, may draw (or determine) a polygonal chain surrounding, above, or below (as illustrated in FIG. 7) a series of image regions with dense white pixels in the background marking image, and determine a region in the target scene corresponding to an image region enclosed by, below, or above the polygonal chain as an interference range. An exemplary polygonal chain is illustrated in FIG. 7.

(c3) The processor 210 may determine the identification range according to the interference range. The identification range may not overlap with the interference range.

For example, after determining the interference range in step (c2), the processor 210, or the marking image unit 323, may determine the identification range according to the height range of the stand-up person and the interference range. For demonstration purposes, in the background marking image illustrated in FIG. 7, the identification range may be a three-dimensional coordinate range including three-dimensional coordinates of actual positions corresponding to pixels in a region below the polygonal chain satisfying 1.3<pyw<2.0.

(c4) The processor 210, or the marking image unit 323, may sift out (e.g., select and/or identify) pixels of which the corresponding actual positions have three-dimensional coordinates under the target coordinate system (or be referred to as third target coordinates) in the identification range in the depth image, which may be designated as first target pixels.

In some embodiments, the processor 210, or the marking image unit 323, may generate a marking image (or mask) according to a position (or image coordinate) distribution of the first target pixels in the depth image, through a process described as following:

For example, the processor 210, or the marking image unit 323, may set second target pixels of the marking image to be generated, whose positions (or coordinates) in the marking image is going to be the same as that of the first target pixels in the depth image, to have gray values of a first gray value (or first gray values). The processor 210, or the marking image unit 323, may also set other pixels of the marking image to be generated to have gray values of a second gray value (or second gray values). A first gray value and a second gray value may be substantially different, so that the second target pixels may be clearly distinguished from the other pixels in the marking image to be generated. In some embodiments, a first gray value may be or be approximate to a gray value of white, such as 200; a second gray value may be or be approximate to a gray value of black, such as 0.

The processor 210, or the marking image unit 323, may generate the marking image according to the gray value of each pixel (the second target pixels and the other pixels) for generating the marking image. An exemplary marking image is illustrated in in FIG. 8. In the marking image, white (or almost-white) pixels are the second target pixels and black (or almost-black) pixels are the other pixels.

Step 540: the processor 210, or the locating coordinate determination unit 324, may determine at least one connected component in the marking image. Any one of pixels in an arbitrary connected component may be adjacent to at least one of other pixels in the same connected component. Any pixel adjacent to any one of the pixels in the connected component having a gray value within a preset gray value range may be in the connected component. The preset gray value range may include the first gray value(s) but not include the second gray value(s). Step 540 and step 550 may be performed in sequence to achieve step 440 of process 400.

In some embodiments, the processor 210, or the locating coordinate determination unit 324, may determine the at least one connected component in the marking image in a process described as following:

The processor 210, or the locating coordinate determination unit 324, may perform a denoising operation on the marking image to generate a denoised marking image.

The processor 210, or the locating coordinate determination unit 324, may determine the at least one connected component including pixels with gray values in the gray value range in the denoised marking image.

In some embodiments, the denoising operation performed by the processor 210, or the locating coordinate determination unit 324, on the marking image may include the following steps:

(d1) The processor 210, or the locating coordinate determination unit 324, may traverse each pixel in the marking image and sift out (e.g., select and/or identify) at least one first pixel having a gray value of the first gray value. For example, the first gray value may be assumed to be 200.

(d2) The processor 210, or the locating coordinate determination unit 324, may perform following operations for each of the at least one first pixel: upon determining that a pixel with a gray value (or be referred to as a rule-out gray value, e.g., the second gray value(s)) other than the first gray value(s) or a third gray value presents in a first preset pixel range having a center at each first pixel, the processor 210, or the locating coordinate determination unit 324, may set the gray value of each first pixel as the third gray value. The third gray value may be approximate to a gray value of white but different from the rule-out gray value, and the third gray value may not be included in the preset gray value range. For example, the third gray value may be assumed to be 199.

In some embodiments, assuming that a first pixel has a coordinate of (m, n) in the marking image, the first preset pixel range may be a range satisfying m−3<=x<=m+3 and n−3<=y<=n+3, wherein (x, y) may represent a coordinate of an arbitrary pixel in the first preset pixel range.

(d3) The processor 210, or the locating coordinate determination unit 324, may traverse each pixel in the marking image again and sift out (e.g., select and/or identify) at least one second pixel having a gray value of the first gray value(s).

(d4) The processor 210, or the locating coordinate determination unit 324, may perform the following operations for each of the at least one second pixel: the processor 210, or the locating coordinate determination unit 324, may sift out (e.g., select and/or identify) at least one third pixel having a gray value other than the first gray value(s) from a second preset pixel range having a center at the second pixel. The processor 210, or the locating coordinate determination unit 324, may set a gray value of the at least one third pixel sifted out as a fourth gray value. The fourth gray value may be included in the preset gray value range. The fourth gray value may be or be approximate to a gray value of white. For example, the fourth gray value may be assumed to be 255.

In some embodiments, assuming that the second pixel has a coordinate of (m1, n1) in the marking image, the second preset pixel range may be a range satisfying m1-3<=x1<=m1+3 and n1-3<=y1<=n1+3, wherein (x1, y1) may represent a coordinate of an arbitrary pixel in the second preset pixel range.

Figure 8:
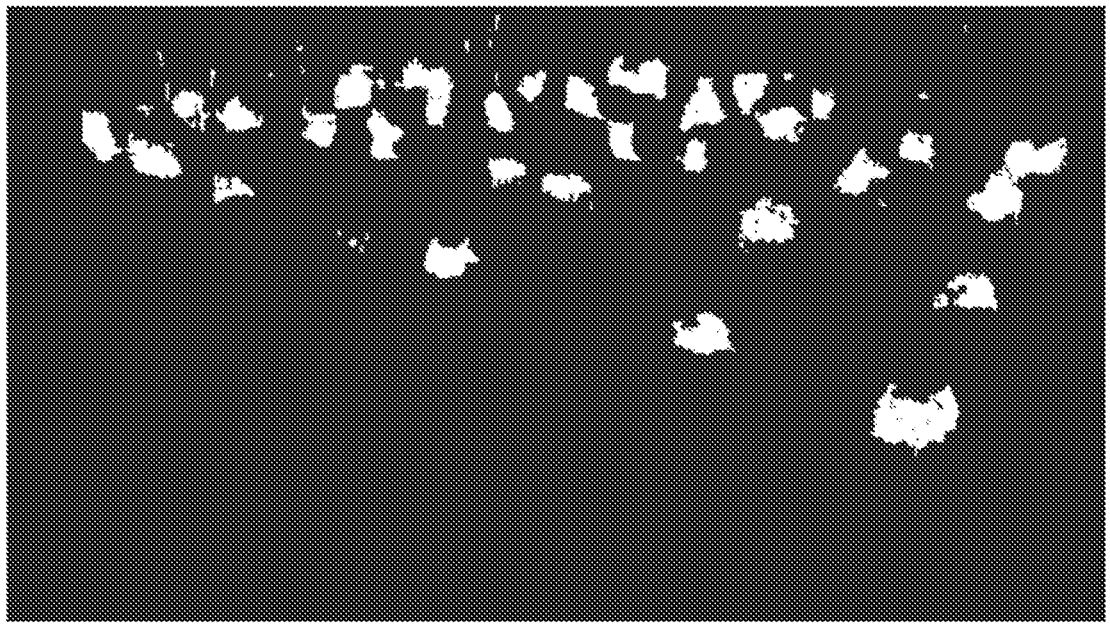
FIG. 8 is a schematic diagram illustrating an exemplary marking image according to some embodiments of the present disclosure.
Figure 9:
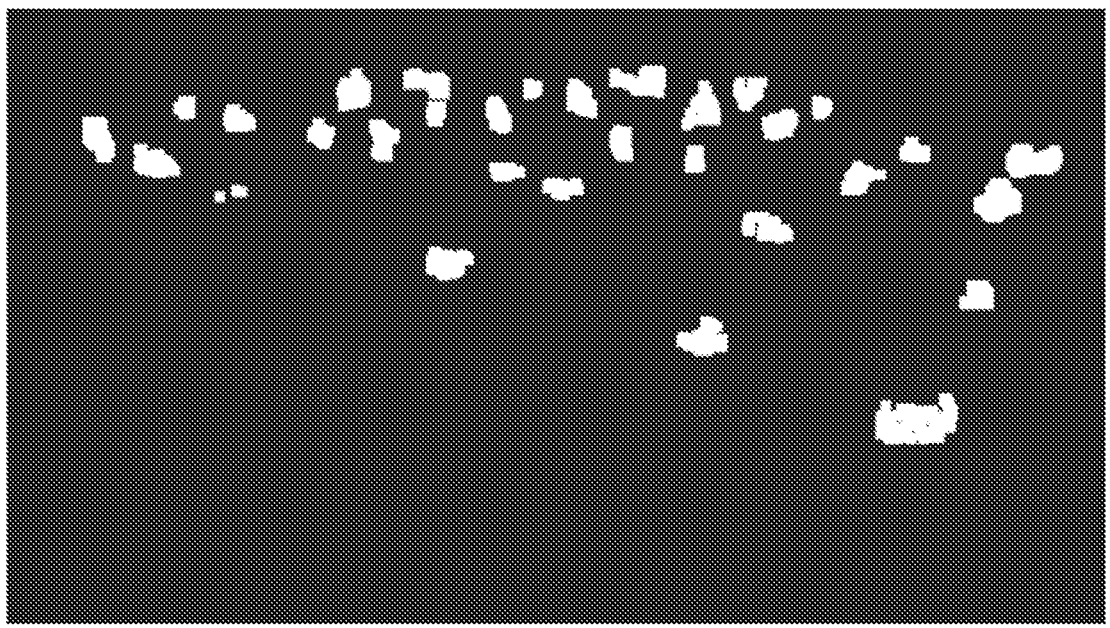
FIG. 9 is a schematic diagram illustrating an exemplary marking image obtained by denoising the marking image illustrated in FIG. 8 according to some embodiments of the present disclosure.

An exemplary denoised marking image obtained by denoising the marking image through the aforementioned steps is illustrated in FIG. 9. It may be seen from FIG. 9 that, compared to FIG. 8, the connected components illustrated in FIG. 9 is smoother than the connected component illustrated in FIG. 8. Small connected components in FIG. 8 that may be negligible is also removed in FIG. 9. Therefore, by performing the denoising operation, the connected component in the marking image may be more accurate, and the position of the target object to be located may be determined more accurately in the marking image.

Step 550: the processor 210, or the locating coordinate determination unit 324, may sift out (e.g., select and/or identify) a target connected component with a number of pixels greater than or equal to a preset threshold from the at least one connected component, and designate a three-dimensional coordinate (or be referred to as a fourth target coordinate) of an actual position corresponding to a center of the target connected component under the target coordinate system as the three-dimensional coordinate (locating coordinate) of the target object in the target scene. Step 540 and step 550 may be performed in sequence to achieve step 440 of process 400.

In some embodiment, a plurality of target connected components may be sifted out. Correspondingly, a plurality of target objects may be determined with a same number of three-dimensional coordinates.

In some embodiments, the target object may be a stand-up person. The processor 210, or the locating coordinate determination unit 324, may set the preset threshold (e.g., 50) according to the face of the stand-up person. Then the processor 210, or the locating coordinate determination unit 324, may determine the number of pixels included in the at least one connected component using a technique in the art and determine a connected component with a number of pixels greater than or equal to the preset threshold (e.g., 50) as the target connected component.

In some embodiments, after the target connected component is sifted out, a pixel coordinates at a center of the target connected component may be a coordinate of the target object in the image coordinate system (e.g., as illustrated in FIG. 6). Denoting the target connected component (or one of the target connected components) as a target connected component A, a pixel coordinate (cx, cy) of a center of the target connected component A may satisfy the Equation (3), which may be expressed as following:

$$\begin{cases} cx = \sum_{p(s,q) \in A} \frac{s}{N} \\ cy = \sum_{p(s,q) \in A} \frac{q}{N} \end{cases} \quad \text{Equation (3)}$$

wherein, p(s, q) represents a coordinate of an arbitrary pixel in the target connected component A, and N is the number of pixels in the target connected component A.

After the coordinate of the center of the target connected component is obtained through the aforementioned process, a three-dimensional coordinate under the target coordinate system of an actual position corresponding to the center of the target connected component may be obtained (e.g., by the locating coordinate determination unit 324 and/or the coordinate determination unit 322) using the process described in step 520 for determining a three-dimensional coordinate under the target coordinate system of an actual position corresponding to a pixel. A three-dimensional coordinate of the target object in the target scene may then be obtained. Therefore, the actual position of the target object in the target scene may be determined, resulting in an accurate locating of the target object, which may enable performing subsequent operations upon the target object.

For example, the target object may be a stand-up person. After the three-coordinate of the stand-up person in the target scene is determined, information such as a name of the stand-up person may be obtained (e.g., by the locating device 140) according to a seating chart and the three-dimensional coordinate. Follow-ups such as shooting in close-up or communicating with the stand-up person may then be performed subsequently.

FIG. 6 is a schematic diagram illustrating exemplary relationships among an image coordinate system, a camera coordinate system (sensor coordinate system), a target coordinate system according to some embodiments of the present disclosure. The relationships may be used for locating a target object in a target scene captured by an image capturing mechanism (e.g., the image capturing mechanism 110) including a first camera 610 (first image sensor) and a second camera 620 (second image sensor). Optical centers of the first camera 610 (e.g., a left camera) and the second camera 620 (e.g., a right camera) may define a linear segment, which may be referred to as a baseline of the image capturing mechanism (e.g., a binocular camera). The baseline may be parallel with a horizontal plane (or the ground).

An image coordinate system may be a two-dimensional coordinate system describing a position of a pixel in an image such as an original image, a depth image, or a marking image. In the present disclosure, an original pixel in an original image (e.g., first original image taken by the first camera 610), a first corresponding pixel (e.g., a first target pixel) in a depth image generated according to the original pixel, and a second corresponding pixel (e.g., a second target pixel) in a marking image generated according to the first corresponding pixel, may all correspond to a same point in the target scene. So the first original image, the depth image, and the marking image may all use a same image coordinate system as illustrated in FIG. 6. For example, for a rectangular image, the original ($O_I$) of the image coordinate system may be one of vertices of the image (e.g., the bottom left vertex). An $X_I$ axis and a $Y_I$ axis of the image coordinate system may be parallel with adjacent sides of the image. In some embodiments, the $X_I$ axis may be parallel with the ground.

A camera coordinate system (sensor coordinate system) may be a three-dimensional coordinate describing actual positions (or points) corresponding to pixels of an image with respect to a camera (e.g., the first camera 610) taking the image. As the depth image and the marking image may share a same image coordinate system with the first original image, a camera coordinate system of the left camera 610 may also correlate with the image coordinate system of the marking image or the depth image.

In the present disclosure, an original ($O_C$) of the camera coordinate system may be an optical center of the first camera 610. The original $O_C$ may correspond to a center point 630 of the image (the first original image, the depth image or the marking image). An $X_C$ axis and a $Y_C$ axis of the camera coordinate system may be parallel with the $X_I$ axis and the $Y_I$ axis of the image coordinate system of the image. For example, the XC axis may be parallel with the ground. An ZC axis may be the optical axis of the first camera 610. An angle defined by a horizontal plane and the ZC axis (or the optical axis) may be the pitch angle θ involved in the Equation (2).

A target coordinate system (e.g., a world coordinate system) may be a three-dimensional coordinate system describing actual positions (or points) corresponding to pixels by an image (e.g., the depth image and/or the original images) with respect to a scene (e.g., the target scene) showed by the image. An original (OW) of the target coordinate system may be set on the ground. In some embodiments, a projection point of the optical center of the first camera 610 on the ground along a vertical line may be set as the original OW; an XW axis of the target coordinate system may be parallel with the XC axis; a YW axis may be perpendicular to the ground, and a ZW axis may be a projection of the optical axis of the first camera 610 (or the ZC axis) on the ground. A height between the optical center of the first camera 610 and the ground may be the height h involved in the Equation (2).

Equation (1) may be adopted for converting an image coordinate under an image coordinate system to a corresponding camera coordinate under a corresponding camera coordinate system. Equation (2) may be adopted for converting a camera coordinate under a camera coordinate system to a corresponding target coordinate under a target coordinate system. A combined equation of Equation (1) and Equation (2) may be adopted for converting an image coordinate to a corresponding target coordinate directly. However, it is to be understood that the one-step coordinate conversion from an image coordinate to a target coordinate using the combined equation may also be considered as first converting the image coordinate to a corresponding camera coordinate, then converting the camera coordinate to the target coordinate.

FIG. 7 is a schematic diagram illustrating an exemplary background marking image according to some embodiments of the present disclosure. The white pixels in the background marking image are disrupting pixels representing interferents in the target region. The white polygonal chain in the background marking image differentiate an inference range (above the polygonal chain) from the rest part of the marking image.

FIG. 8 is a schematic diagram illustrating an exemplary marking image according to some embodiments of the present disclosure. The white pixels in the marking image are second targeting pixels representing potential target objects. A plurality of connected components may be identified in the FIG. 8.

FIG. 9 is a schematic diagram illustrating an exemplary marking image obtained by denoising the marking image illustrated in FIG. 8 according to some embodiments of the present disclosure. Compared to FIG. 8, the connected components illustrated in FIG. 9 is smoother than the connected component illustrated in FIG. 8. Small connected components in FIG. 8 that may be negligible is also removed in FIG. 9.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A locating system for locating a target object in a target scene, comprising at least one locating device, wherein during operation, the at least one locating device is configured to:
   obtain a depth image of the target scene, the depth image including a plurality of pixels;
   for each of the plurality of pixels of the depth image, determine a first target coordinate under a target coordinate system;
   generate a marking image based on the depth image and the first target coordinates of the plurality of pixels in the depth image, wherein the marking image represents potential target objects in the depth image;
   determine at least one connected component in the marking image under an image coordinate system; and
   determine a locating coordinate of the target object under the target coordinate system based on the at least one connected component.

2. The locating system of claim 1, to generate the depth image, the at least one locating device is configured to:
   receive first electronic signals including a first image of the target scene taken by a first image sensor;
   receive second electronic signals including a second image of the target scene taken by a second image sensor; and
   for each pixel in the first image:
      determine a horizontal parallax between the pixel of the first image and a corresponding pixel of the second image; and
      according to the horizontal parallax, assign a gray value to a corresponding pixel of the depth image.

3. The locating system of claim 2, further comprising:
   the first image sensor configured to obtain the first image of the target scene; and
   the second image sensor at a predetermined distance from the first image sensor, configured to obtain the second image of the target scene simultaneously with the first image sensor, wherein
   the first image includes a plurality of pixels one-to-one corresponding to a plurality of pixels in the second image.

4. The locating system of claim 3, wherein the first image sensor is at least part of a first camera in a binocular camera; and the second image sensor is at least part of a second camera in the binocular camera.

5. The locating system of claim 2, wherein for each of the plurality of pixels in the depth image, to determine the first target coordinate, the at least one locating device is configured to:
determine a sensor coordinate of the pixel under a sensor coordinate system with respect to the first image sensor according to a first image coordinate and the gray value of the pixel; and
determine the first target coordinate according to the sensor coordinate of the pixel.

6. The locating system of claim 2, further comprising a controller, wherein:
the locating device is further configured to transmit third electronic signals including the locating coordinate to the controller; and
the controller, upon receiving the third electronic signals, transmits a control signal to at least one of the first image sensor or the second image sensor, causing the at least one of the first image sensor or the second image sensor to be focused or zoomed in towards the locating coordinate.

7. The locating system of claim 1, wherein to generate the marking image according to the depth image and the plurality of first target coordinates, the at least one locating device is configured to:
determine disrupting pixels in the depth image, the disrupting pixels indicating one or more interferents presented in the target scene;
for each of the disrupting pixels, determine a second target coordinate;
determine an interference range in the target scene according to the second target coordinates and a target region in the target scene where the target object is predicted to appear;
determine an identification range in the target scene according to the interference range and the target region by excluding disrupting pixels from the target scene, wherein the identification range does not overlap with the interference range;
identify first target pixels having third target coordinates within the identification range in the depth image; and
generate the marking image according to the first target pixels.

8. The locating system of claim 7, wherein:
the marking image includes second target pixels corresponding to the first target pixels;
the second target pixels have first gray values; and
other pixels in the marking image have second gray values.

9. The locating system of claim 1, wherein to determine the locating coordinate of the target object based on the at least one connected component, the at least one locating device is configured to:
determine a target connected component from the at least one connected component;
determine a locating point in the marking image according to the target connected component; and
determine the locating coordinate according to a second image coordinate of the locating point.

10. The locating system of claim 9, wherein to determine the target connected component from the at least one connected component, the at least one locating device is configured to:

identify a connected component having a number of pixels greater than or equal to a preset threshold from the at least one connected component as the target connected component.

11. A method for locating a target object in a target scene, comprising:
obtaining, by a locating device, a depth image of the target scene, the depth image including a plurality of pixels;
for each of the plurality of pixels of the depth image, determining, by the locating device, a first target coordinate under a target coordinate system;
generating, by the locating device, a marking image according to the depth image and the first target coordinates of the plurality of pixels in the depth image, wherein the marking image represents potential target objects in the depth image;
determining at least one connected component in the marking image under an image coordinate system; and
determining, by the locating device, a locating coordinate of the target object under the target coordinate system based on the at least one connected component.

12. The method of claim 11, wherein the generating the depth image comprises:
receiving first electronic signals including a first image of the target scene taken by a first image sensor;
receiving second electronic signals including a second image of the target scene taken by a second image sensor; and
for each pixel in the first image:
determining a horizontal parallax between the pixel of the first image and a corresponding pixel of the second image; and
according to the horizontal parallax, assigning a gray value to a corresponding pixel of the depth image.

13. The method of claim 12, further comprising:
obtaining, by the first image sensor, the first image of the target scene; and
obtaining, by the second image sensor at a predetermined distance from the first image sensor, the second image of the target scene simultaneously with the first image sensor, wherein
the first image includes a plurality of pixels one-to-one corresponding to a plurality of pixels in the second image.

14. The method of claim 12, wherein for each of the plurality of pixels in the depth image, the determining the first target coordinate comprises:
determining a sensor coordinate of the pixel under a sensor coordinate system with respect to the first image sensor according to a first image coordinate and the gray value of the pixel; and
determining the first target coordinate according to the sensor coordinate of the pixel.

15. The method of claim 12, further comprising:
transmitting, by the locating device, third electronic signals including the locating coordinate to the controller; and
transmitting, by a controller upon receiving the third electronic signals, a control signal to at least one of the first image sensor or the second image sensor, causing the at least one of the first image sensor or the second image sensor to be focused or zoomed in towards the locating coordinate.

16. The method of claim 11, wherein the generating the marking image according to the depth image and the plurality of first target coordinates comprises:

determining disrupting pixels in the depth image, the disrupting pixels indicating one or more interferents presented in the target scene;

for each of the disrupting pixels, determining a second target coordinate;

determining an interference range in the target scene according to the second target coordinates and a target region in the target scene where the target object is predicted to appear;

determining an identification range in the target scene according to the interference range and the target region by excluding disrupting pixels from the target scene, wherein the identification range does not overlap with the interference range;

identifying first target pixels having third target coordinates within the identification range in the depth image; and generating the marking image according to the first target pixels.

17. The method of claim 16, wherein:

the marking image includes second target pixels corresponding to the first target pixels;

the second target pixels have first gray values; and other pixels in the marking image have second gray values.

18. The method of claim 11, wherein the determining the locating coordinate of the target object based on the at least one connected component comprises:

identifying a connected component having a number of pixels greater than or equal to a preset threshold from the at least one connected component as a target connected component;

determining a locating point in the marking image according to the target connected component; and determining the locating coordinate according to a second image coordinate of the locating point.

19. A non-transitory computer readable medium, storing instructions, the instructions when executed by a processor, causing the processor to execute operations comprising:

obtaining a depth image of the target scene, the depth image including a plurality of pixels;

for each of the plurality of pixels of the depth image, determining a first target coordinate under a target coordinate system;

generating a marking image according to the depth image and the first target coordinates of the plurality of pixels in the depth image, wherein the marking image represents potential target objects in the depth image;

determining at least one connected component in the marking image under an image coordinate system; and determining, by the locating device, a locating coordinate of the target object under the target coordinate system based on the at least one connected component.

20. The locating system of claim 7, wherein to determine the disrupting pixels in the depth image, the at least one locating device is further configured to:

obtain a background depth image of the same target scene without the target object;

for each of a plurality of pixels of the background depth image, determine a forth target coordinate under the target coordinate system;

determine, in the background depth image, the disrupting pixels from the plurality of pixels of the background depth image based on a height distribution range of the target object under the target coordinate system; and determine corresponding disrupting pixels in the depth image based on the disrupting pixels in the background depth image.

* * * * *